United States Patent
Barak et al.

(10) Patent No.: US 10,574,825 B2
(45) Date of Patent: Feb. 25, 2020

(54) ASSISTED-COMMUNICATION WITH INTELLIGENT PERSONAL ASSISTANT

(71) Applicant: MICROSOFT TECHNOLOGY LICENSING, LLC, Redmond, WA (US)

(72) Inventors: Ori Barak, Tel Aviv (IL); Erez Altus, Tel Aviv (IL); Hen Fitoussi, Ramat Hasharon (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/433,742

(22) Filed: Feb. 15, 2017

(65) Prior Publication Data
US 2018/0234545 A1 Aug. 16, 2018

(51) Int. Cl.
H04M 3/527 (2006.01)
H04M 3/493 (2006.01)

(52) U.S. Cl.
CPC ........... *H04M 3/527* (2013.01); *H04M 3/493* (2013.01)

(58) Field of Classification Search
CPC .. H04M 3/527; H04M 3/493; H04M 3/42068; H04M 2203/254;
(Continued)

(56) References Cited

U.S. PATENT DOCUMENTS

| | | |
|---|---|---|
| 5,745,550 A | 4/1998 | Eisdorfer et al. |
| 6,170,011 B1 * | 1/2001 | MacLeod Beck ........................... G06F 17/30017 379/265.01 |
| 6,381,640 B1 * | 4/2002 | Beck ................. G06F 17/30017 707/E17.009 |
| 6,658,102 B1 | 12/2003 | Van Amerongen |

(Continued)

FOREIGN PATENT DOCUMENTS

| | | |
|---|---|---|
| WO | 1996011542 A2 | 4/1996 |
| WO | 2014071391 A1 | 5/2014 |

OTHER PUBLICATIONS

Galliart, Jessica., "Does it Work?: LucyPhone Waits Out Customer Service Calls", Published on: Jul. 27, 2010 Available at: http://www.everythingicafe.com/does-it-work-lucyphone-waits-out-customer-service-calls/.

(Continued)

*Primary Examiner* — Akelaw Teshale
(74) *Attorney, Agent, or Firm* — Shook, Hardy & Bacon L.L.P.

(57) ABSTRACT

Aspects of the technology described herein can provide assisted-communication with an intelligent personal assistant. An exemplary computing device may use a profile handler to receive a user profile of a user and a system profile of an interactive communications system. Moreover, a context handler in the exemplary computing device may receive an indication of a communication event related to the user, such as a call or message, and context information associated with the event. Further, a communication handler in the exemplary computing device may use the context information, the user profile, and/or the system profile to navigate the interactive system for the user. In some instances, where a user is unavailable to address a communication event, the intelligent personal assistant may utilize the communication handler to intercept the communication and negotiate the session on behalf of the user.

20 Claims, 7 Drawing Sheets

(58) Field of Classification Search
CPC ......... H04M 3/42042; H04M 15/8044; H04M 15/88; H04M 1/645; H04M 1/72519; H04M 2203/2061; H04M 2203/558; H04M 2203/651; H04M 2207/12; H04M 2207/18; H04M 2215/42; H04M 3/02; H04M 3/2218; H04M 3/2281; H04M 3/385; H04M 3/42195; H04M 3/42221; H04M 3/42357; H04M 3/42365; H04M 3/4878; H04M 3/4936; H04M 3/4938; G06Q 30/0201; G06Q 30/01; H04L 67/306; H04L 67/22; H04L 43/06; H04L 43/08; H04L 51/02
USPC ...................................... 379/88.18
See application file for complete search history.

(56) References Cited

U.S. PATENT DOCUMENTS

| | | | |
|---|---|---|---|
| 6,690,776 B1 | 2/2004 | Raasch | |
| 6,954,521 B2 | 10/2005 | Bull et al. | |
| 7,515,699 B2* | 4/2009 | Cooper | H04M 1/72583 340/7.21 |
| 7,552,393 B2 | 6/2009 | Hayes-Roth | |
| 7,881,450 B1 | 2/2011 | Gentle et al. | |
| 8,184,789 B2 | 5/2012 | Ryskamp | |
| 8,345,835 B1* | 1/2013 | Or-Bach | G06Q 30/0269 379/114.13 |
| 8,401,159 B2 | 3/2013 | Tal et al. | |
| 8,767,948 B1* | 7/2014 | Riahi | H04M 3/4936 379/266.08 |
| 8,838,072 B2 | 9/2014 | Sawhney et al. | |
| 9,313,332 B1* | 4/2016 | Kumar | H04M 3/5232 |
| 9,318,108 B2 | 4/2016 | Gruber et al. | |
| 2001/0025309 A1* | 9/2001 | MacLeod Beck | G06F 17/2765 709/223 |
| 2008/0075240 A1 | 3/2008 | Ramanathan et al. | |
| 2013/0275164 A1* | 10/2013 | Gruber | G10L 17/22 705/5 |
| 2014/0314225 A1* | 10/2014 | Riahi | G06Q 30/02 379/265.09 |
| 2014/0365226 A1* | 12/2014 | Sinha | G10L 25/00 704/275 |
| 2015/0199651 A1* | 7/2015 | Raman | G06Q 10/1095 705/7.19 |
| 2015/0199967 A1* | 7/2015 | Reddy | G10L 25/30 704/249 |
| 2015/0312411 A1 | 10/2015 | Miller et al. | |
| 2015/0373183 A1 | 12/2015 | Woolsey et al. | |
| 2016/0036983 A1 | 2/2016 | Korolev et al. | |
| 2016/0080567 A1 | 3/2016 | Hooshiari et al. | |
| 2016/0203002 A1* | 7/2016 | Kannan | G06F 3/167 715/708 |
| 2017/0140041 A1* | 5/2017 | Dotan-Cohen | G06Q 10/04 |
| 2017/0160813 A1* | 6/2017 | Divakaran | G06F 3/017 |
| 2018/0191884 A1* | 7/2018 | Goldgraber | H04M 3/42221 |

OTHER PUBLICATIONS

"International Search Report and Written Opinion Issued in PCT Application No. PCT/US2018/016936", dated Apr. 17, 2018, 11 Pages.

* cited by examiner

ASSISTED-COMMUNICATION WITH INTELLIGENT PERSONAL ASSISTANT

BACKGROUND

Historically, interactive systems have been created to enable users to exchange information with service providers. After the Internet became more accessible to the public, interactive systems blossomed out in the Internet, e.g., in the forms of web-based interactive information systems, chatbots, interactive online games, etc.

Interactive voice response (IVR) is a technology widely used even before the Internet era for interactive systems, particularly for customer services or customer relationship management (CRM). IVR allows a user to interact with a computer through the use of natural voice and/or dual tone multi frequency (DTMF) tones input via telephone keypad. Via the IVR dialogue, users can interact with IVR systems for information retrieval (e.g., to retrieve travel information, weather conditions), transactions (e.g., banking, purchasing), etc.

Today, users may have to navigate an IVR system first to acquire assistance from a live person to resolve complex issues. Some IVR systems are intricate for users to navigate, e.g., due to non-intuitive menu design. On the other hand, it is quite often that a user may have to wait on the line for a period of time until they can be connected to a representative. As an example, when calling for customer services, one may frequently encounter the pre-recorded message, such as "due to unusually high call volume, you may encounter longer wait times," even after successfully going through multiple states of the IVR system. Thus, although it is a useful technology for businesses, IVR has nonetheless become an obstacle to many users.

SUMMARY

In various aspects, systems, methods, and computer-readable storage devices are provided for assisted-communication with an intelligent personal assistant. One aspect of the technology described herein is to improve computer technology for profiling users, interactive systems, and actions. Another aspect of the technology described herein is to improve computer technology for substantially automatically navigating IVR systems. Yet another aspect of the technology described herein is to improve computer technology for substantially automatically performing actions for users. Many other aspects of the technology described herein are to improve user experience associated with an interactive system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is illustrated by way of example and not limitation in the accompanying figures in which like reference numerals indicate similar elements and in which.

DETAILED DESCRIPTION

The various technologies described herein are set forth with sufficient specificity to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

IVR is a communications technology that is valuable to many businesses and companies. Some IVR technologies utilize automated speech recognition (ASR) or automated speech generation (ASG), in which users interact with IVR systems in natural language to retrieve information or conduct transactions. As an example, customers may interact with a company's IVR system via a telephone keypad or by speech recognition to inquire about products and/or receive services. Comparatively, the IVR systems can respond with pre-recorded or dynamically generated audio to further direct users on how to proceed. The IVR system adds increased inbound call handling capabilities to the company. Meanwhile, IVR systems are increasingly being used to place outbound calls for tasks such as delivering or gathering information for appointments, paying bills, and many other time-sensitive events and activities. Regardless of inbound or outbound calls, an IVR system usually can handle a large number of calls with only a limited number of customer service representatives.

However, to resolve complex issues, a user may have to navigate through the multiple levels of an IVR system in order to reach a representative. Tension may build up in this process as an IVR system may require the user or caller to provide detailed and complete caller information and verify the caller information with its customer relationship management (CRM) database before routing the caller to its representative. This may be used to provide a real-time contextual preview of customer data and interactions up until that point can empower the representative to deliver effective personalized service. On the other hand, it can be tedious for the caller to navigate a complex menu in the IVR system, and the caller may also be frustrated by the imperfect ASR and/or ASG technologies. Further, users may have to wait on the line for a significant period of time before a representative becomes available.

Several solutions to addressing these technological limitations of IVR technology have been introduced. For example, some technologies attempt to reduce the stress of callers waiting on the line to speak with representatives, such as certain technologies integrated with IVR systems that call the user back after a representative becomes available. But these technologies usually still require the user to provide caller information first, in order to determine context and/or basic information from the caller. As another example, some services are utilized to substitute for requiring users to wait on the line, notifying users once a live person becomes available. However, none of these solutions include technologies that enable a user to bypass the IVR system and directly speak with the representative or, furthermore, provide the representative with the basic information of the caller and context information of the call.

In other scenarios, a user may be unavailable to respond to an incoming communication event (such as an incoming voice call or a message). For instance, a user may be unavailable because the user is engaged in another activity, such as sleeping. Similarly, a user may be unreachable, such as when the user is backpacking in the mountains. Further, a user may want to prioritize his or her other activities over an incoming communication event, such as when the user is speaking during a meeting. Typically, the incoming communication event will transpire without being processed in substance; for instance, a missed call may end up reaching a voice mailbox. Although some users may utilize human answering services, which often function like a voice mailbox, even with human assistance, it remains a challenge for one person to answer incoming calls for another person due to lacking the personal information of the intended callee and the contextual information of the call.

Assisted-communication technologies with an intelligent personal assistant ("IPA") are disclosed herein to solve some of the aforementioned limitations of conventional IVR technology. As used herein, an IPA may comprise a virtual assistant program or personal digital assistant program, which may be embodied as one or more computing applications, services, or software agents operating on a user computing device (user device), across multiple user devices, and/or in a computing cloud. One example of an IPA is the Microsoft® Cortana® virtual assistant.

Various embodiments of the technologies described herein may utilize an IPA to save time and reduce the hassle for a user by determining an appropriate communication channel for the user, automatically navigating through an IVR system if needed, waiting on the line on behalf of the user, and/or engaging the user only at the necessary time(s), such as when a live representative appears on the other side of the line. The term communication channel, as used herein, means a communication session in a particular form and may include related communication protocols; for instance, a voice call carried out over appropriate protocols for voice over Internet protocol (VoIP). In addition, when the user is unavailable to engage a communication channel (e.g., during a meeting), an IPA may communicate on the user's behalf and take necessary or desired actions (e.g., to reply to a message, answer a call, make a call, schedule an appointment) on behalf of the user.

Accordingly, in one example, an IPA (or similar computer program or service) receives or derives information from a user, which may include: a party for communication; a reason, motive or intention, or desired outcome for such communication; and a schedule of when the user is available to engage the communication (e.g., take the call from or to the party). The information may be provided by the user (such as by voice, text, configuring settings, filling a form, or similar means) or it may be derived from user activity and user information accessible via the user device or user accounts in the cloud. For example, user activity such as calendars (which may be used to determined user availability), email, other communications, browsing or app usage, location, motion or accelerometric information (which may indicate the user is working out) or other user activity including patterns of user activity that may be detected via sensors and services operating on a user device.

Next, the IPA determines contact information of the party for communication (e.g., a telephone number or similar address for communicating with the party), which may be determined by accessing the contacts on the user's device, by searching the Internet, or a specialized database. Further, the IPA can call the number during the time when the user is available. If the line is busy or no one picks up, the IPA may retry or wait on the line until the call gets through. If an IVR system is detected, the IPA may navigate the IVR system, provide the relevant information of the user when requested, which may include a reason or purpose for the call to the IVR system, and wait on the line until a live person is reached. In some embodiments, the IPA navigates the IVR system based on information specified in a profile associated with the user (i.e., a user profile) and/or a system profile for the particular IVR system. The IPA also may navigate the IVR system based on the user's desired outcome or intent for the call, such as paying a bill, scheduling an appointment, reporting a problem, etc. At this point in this example, the IPA may engage the user to the call, e.g., by providing a notification to the user. In this way, the representative is still provided a contextual preview of customer data to deliver effective personalized service to the user, and the user can instantly reach the party and start the discussion for the actual business.

In another example, an IPA determines that the user is unavailable to engage in an incoming communication event, such as answering a call; for instance, the call may occur during a time that the user is scheduled to speak in a conference. The IPA may determine this based on user data accessible via one or more user devices or in user accounts in the cloud, such as calendars, user communications data, or user other user activity data. Upon determining that the user is unavailable, the IPA will intercept an incoming communication event and communicate on the user's behalf. By way of example, suppose an incoming call is received from a fraud prevention department (FPD) in the user's bank to verify a recent suspicious transaction. Contrary to the conventional operation for the FPD to leave a message to the user and for the user to call back the FPD to resolve the issue, according to embodiments described herein, the IPA and the FPD may engage in a mutual authentication process to verify each other's identities, such as using security credential (which may be stored in the user's profile) only known to the user and the bank. Additionally, afterwards the IPA may verify whether the transaction at question was authorized by the user, e.g., based on user activity such as location data or user's purchase-history data accessible to the IPA. In some embodiments, this information also may be stored in a user profile. In this way, the particular fraud issue may be resolved even without the need for the user to call back the FPD.

Figure 1:
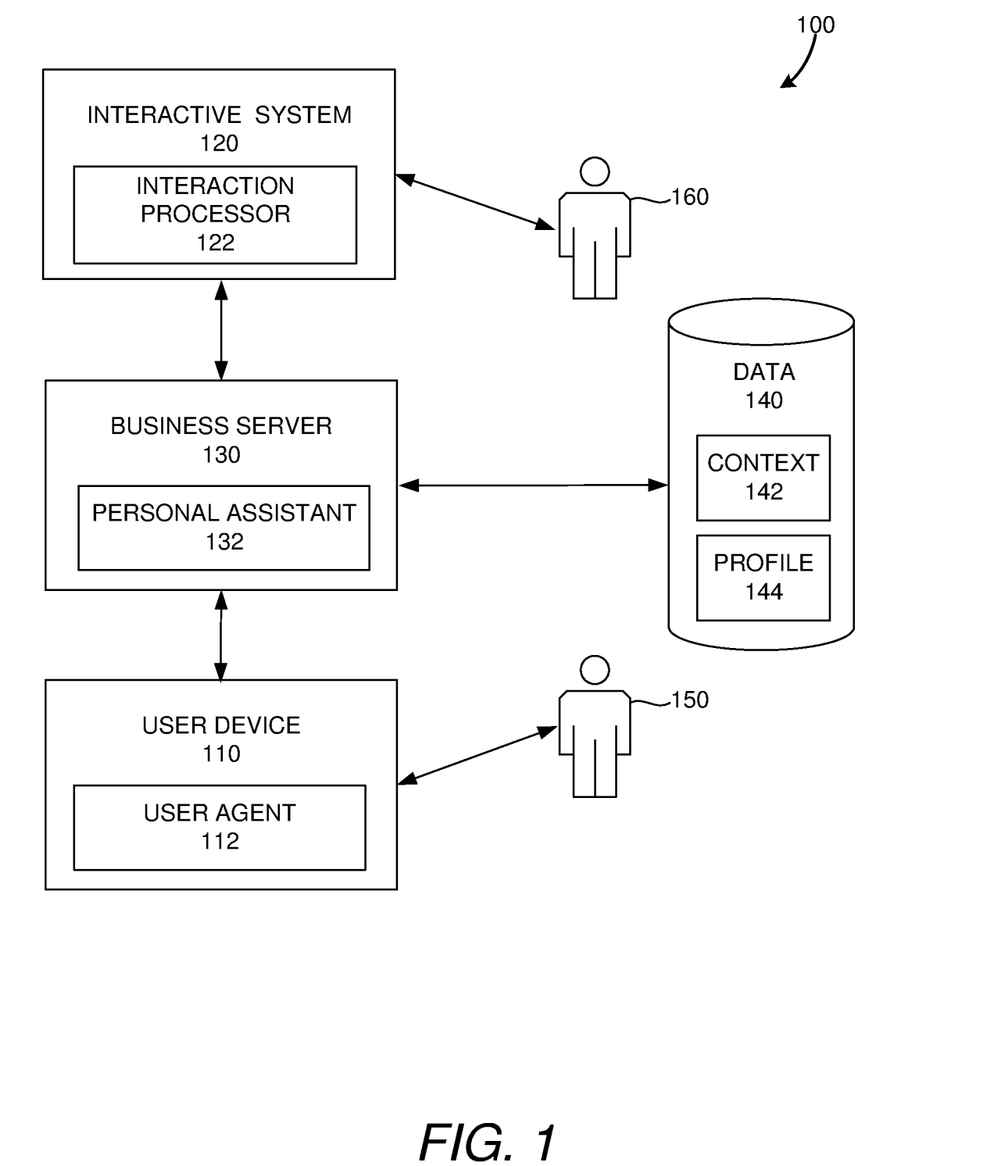
FIG. 1 is a block diagram of an example operating environment suitable for implementing aspects of the present disclosure.

Turning now to FIG. 1, a block diagram is provided showing an example operating environment 100 in which some aspects of the present disclosure may be employed. In operating environment 100, user device 110, interactive system 120, and business server 130 are communicatively coupled with each other to provide assisted-communication for user 150 and representative 160. These components may communicate with each other via networking means, which may include, without limitation, one or more local area networks (LANs) and/or wide area networks (WANs). In exemplary implementations, such networks comprise the Internet and/or cellular networks, amongst any of a variety of possible public and/or private networks.

User device 110 with user agent 112 can assist user 150 to communicate with representative 160 in various embodiments. User device 110 may comprise any type of computing device capable of use by a user. For example, in one aspect, user device 110 may be the type of computing device described in relation to FIG. 7 herein. By way of example and not limitation, a user device may be embodied as a personal computer (PC), a laptop computer, a mobile device, a smartphone, a tablet computer, a smart watch, a wearable computer, a fitness tracker, a virtual reality headset, augmented reality glasses, a personal digital assistant device (PDA), a global positioning system (GPS) device, a handheld communications device, a gaming device or system, a music player, a video player, an entertainment system, a vehicle computer system, an embedded system controller, a remote control, an appliance, a consumer electronic device, a workstation, or any combination of these delineated devices, or any other suitable computing device.

In the particular embodiment of FIG. 1, user agent 112 is shown as a component in user device 110. In various embodiments, user agent 112 may be embodied as a specially designed hardware for assisted-communication, a browser plug-in for assisted-communication, a specially designed computer program or application operating on a user device, across multiple devices, or in the cloud, for assisted-communication, or a computing service running in the cloud to implement one or more aspects of the technical solutions discussed herein for assisted-communication. In some embodiments, user agent 112 is embodied as an IPA or as one or more computer programs or services that operate in conjunction with an IPA for assisted-communication.

In one aspect, user agent 112 works in synergy with personal assistant 132 in business server 130 to enable assisted-communication by, e.g., sending to and receiving messages from personal assistant 132 as well as executing instructions provided by personal assistant 132. In this regard, user agent 112 may intercept a communication channel (e.g., a call) from or to user device 110, e.g., redirect the call to personal assistant 132. Further, user agent 112 may engage user 150 to participate in the communication channel, e.g., causing user device 110 to vibrate or otherwise notifying user 150 when representative 160 appears in the call.

Business server 130 with personal assistant 132 can enable assisted-communication between user device 110 and interactive system 120. In some embodiments, business server 130 is a stand-alone server device. In some embodiments, business server 130 including personal assistant 132 is implemented as services in a computing cloud, like Azure®. Personal assistant 132, in some embodiments, is a stand-alone application; in other embodiments, it is an integrated service component of a framework, e.g., Microsoft's Cortana®. Personal assistant 132 is depicted in business server 130 in this embodiment; however, in other embodiments, personal assistant 132 may be integrated into user agent 112. Similar to user agent 112, personal assistant 132 may be implemented as a standalone set of one or more computer applications or services, as an IPA, or as one or more computer applications or services that operate in conjunction with an IPA for assisted-communication.

Personal assistant 132 can navigate interactive system 120, e.g., based on a user profile of user 150 and a system profile of interactive system 120. In one embodiment, personal assistant 132 may receive an event of communication related to user 150 from user agent 112. For instance, the event may be a calendar event on the user's calendar to claim an unauthorized transaction using the user's credit card. Subsequently, personal assistant 132 may find an appropriate communication method to make such claim. The user profile of user 150 in profile 144 may reveal that historically user 150 preferred to call the credit card company to resolve credit card related issues instead of using web-based communication methods (e.g., chat, email, or web forms), and user 150 has previously called the credit card company to make the initial claim. Further, personal assistant 132 may verify the telephone number for customer services for the credit card company from a system profile for the credit card company stored at profile 144, and retrieve the claim number already assigned to this unauthorized transaction, e.g., from the user profile of user 150 also stored at profile 144.

Further, personal assistant 132 may identify context information related to this event of communication, e.g., from context 142 and other online resources. For example, personal assistant 132 may invoke big data analytics to look for the context information related to this unauthorized transaction. In this instance, personal assistant 132 may find that a number of users having similar issues due to an incident of data breach from a well-known online retailer.

Having gathered the context information related to the event of communication and also ascertained the nature of this event of communication that user 150 likely would like to resolve an existing claim, personal assistant 132 may call the credit card company, e.g., at a time that user 150 prefers (e.g., based on the user's manual input) or would become available to handle this matter (e.g., based on the user's calendar).

The credit card company likely has an IVR system to screen its incoming calls and gather basic caller information. Personal assistant 132 can navigate the IVR system, e.g., based on the user profile, the system profile, and/or the context information. For instance, personal assistant 132 can navigate initially based on the interaction menu of the IVR system, e.g., input the credit card number and verify the user identify with the IVR system. Further, personal assistant 132 can select appropriate menu options or provide voice input to navigate to the claim department. Even more, personal assistant 132 can submit the claim number and indicate that the claim may be related to the suspected data breach incident. After requesting the assistance from a customer service representative to resolve the claim, personal assistant 132 may wait on the line until representative 160 becomes available.

As soon as representative 160 becomes available, personal assistant 132 will engage user 150, e.g., by ringing user device 110. In one embodiment, personal assistant 132 will simultaneously send a message (e.g., a brief executive summary of the call) to user device 110 to provide the background of this call. In another embodiment, personal assistant 132 will also present relevant information related to this claim to user 150, e.g., the information of the unauthorized transaction, the claim history, the necessary steps to complete the claim, etc. In this way, user 150 and representative 160 become well-informed of the call and may effectively resolve the claim.

During or after the call, personal assistant 132 can perform tasks for user 150, e.g., based on a signal from the IVR system, context information associated with the event, or other needs or information that arose in this process. For example, the IVR system may send a signal (e.g., a message) to personal assistant 132, e.g., to require a preliminary claim form to be submitted. Accordingly, personal assistant 132 may prepare the claim form for user 150. Further, personal assistant 132 may follow up the call and schedule a reminder for user 150 based on the outcome of the call.

Instead of initiating a communication channel for user 150, personal assistant 132 may intercept a communication channel between interactive system 120 and user 150. User 150 may specify a list of contacts or business entities that would be handled by personal assistant 132. Alternatively, personal assistant 132 may automatically determine the communication event and when to intercept, e.g., based on the status of user 150. For instance, when user 150 is busy as detected by user agent 112, personal assistant 132 may be configured to intercept selected or all calls to user 150. If the call is from interactive system 120, personal assistant 132 can navigate multiple interactive states in the interactive system, e.g., based on a user profile of user 150 and a system profile of interactive system 120. If personal assistant 132 detects a signal indicative of a live person, personal assistant 132 may engage user 150 to the call.

Advantageously, personal assistant 132 can navigate those interactive systems, such as an IVR system. Personal assistant 132 can wait on the line for users. Further, personal assistant 132 can connect the user to the communication channel once a live person is presented. Personal assistant 132 can answer calls or intercept other types of communication channels for user 150 and communicate on the behalf of user 150. Even further, personal assistant 132 can take other actions for the user, e.g., based on the information learned from the communication.

Data 140 represents heterogenous data sources and data storage. Data 140 may include public information, such as news, stock information, business profiles, etc., selectively stored in context 142. Data 140 may include private information, such as user profiles of users and system profiles of various interactive systems, e.g., stored in profile 144. The process to build profile 144 is further disclosed in connection with FIG. 2 and FIG. 3.

Interactive system 120 may include IVR systems and other communication systems, like chat system, messaging systems, email systems, interactive webpages, etc. Interaction processor 122 may handle communication channels to interactive system 120. A communication channel may be a voice/video call, a real-time chat session, an asynchronous messaging channel, an email, etc., depending on the nature of interactive system 120. In some embodiments, interaction processor 122 follows a predesigned road map to process interactions, e.g., a set of pre-recorded messages in an IVR system. In other embodiments, interaction processor 122 may utilize artificial intelligence technologies to dynamically guide the interactions.

Figure 2:
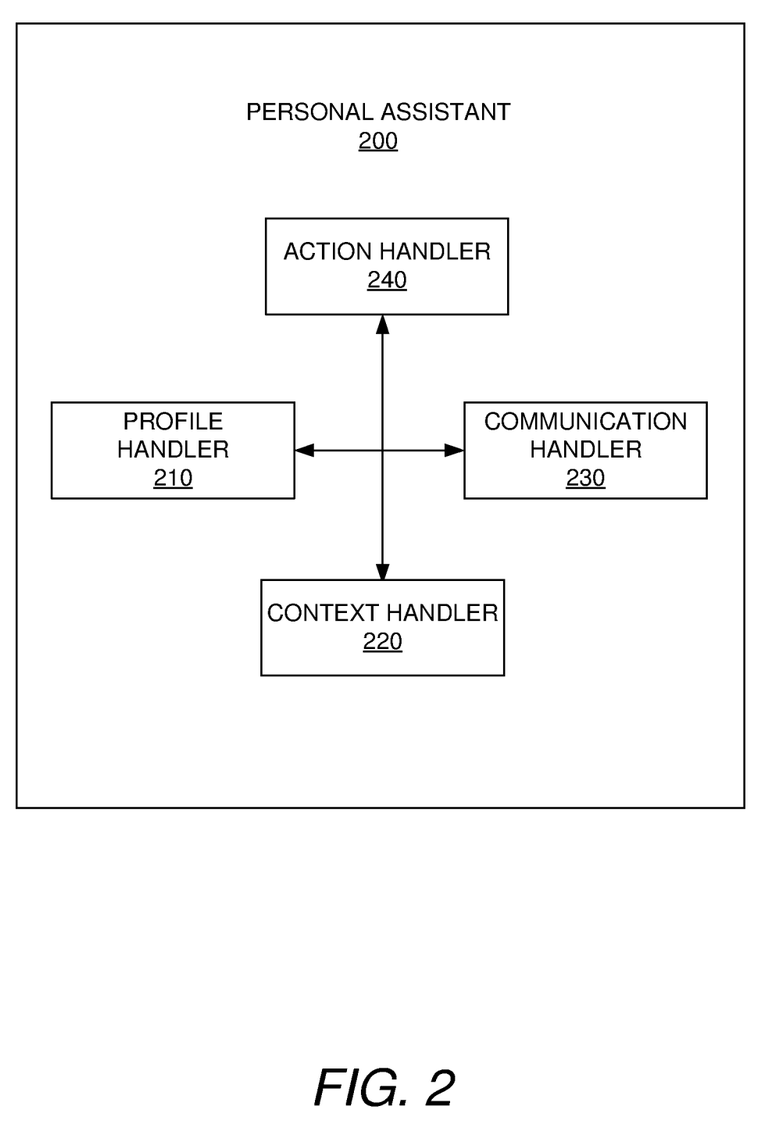
FIG. 2 is a block diagram depicting an example personal assistant suitable for implementing aspects of the present disclosure.
Figure 3:
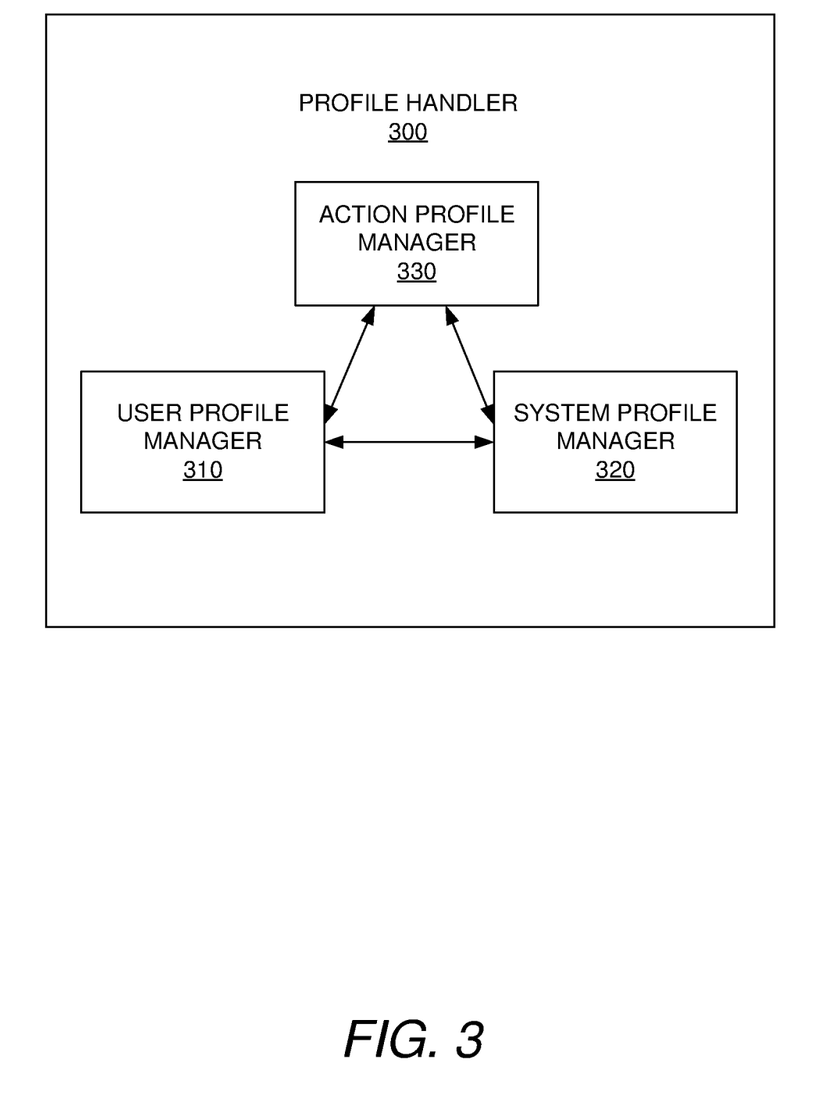
FIG. 3 is a block diagram depicting an example profile handler suitable for implementing aspects of the present disclosure.

It should be understood that operating environment 100 shown in FIG. 1 is an example of one suitable operating environment. Each of the components shown in FIG. 1 may be implemented via any type of computing device, such as computing device 700 described in connection to FIG. 7, for example. Other arrangements and elements (e.g., machines, interfaces, functions, orders, and groupings of functions, etc.) can be used in addition to or instead of those shown, and some elements may be omitted altogether for the sake of clarity. Further, this division of various components in operating environment 100 is provided to illustrate one example of a suitable environment, and there is no requirement for each implementation that a user device, an interactive system, a business server, and their respective inner components remain as separate entities. Further, many of the components described herein, such as the components of FIGS. 1, 2, and 3, are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Referring now to FIG. 2, a block diagram is provided showing an exemplary computing device or application (which may comprise a set of one or more computing routines, programs or services) suitable for implementing one or more aspects of the present disclosure. The exemplary computing device or application is designated generally as personal assistant 200. Personal assistant 200 includes system components of profile handler 210, context handler 220, communication handler 230, and action handler 240, communicatively coupled to each other. In some embodiments, personal assistant 200 is embodied as personal assistant 132 in FIG. 1, and may be implemented as a standalone set of one or more computer applications or services, as an IPA, or as one or more computer applications or services that operate in conjunction with an IPA for assisted-communication.

Profile handler 210 is configured to manage profile information, such as user profiles for users, system profiles for interactive systems, action profiles for actions, etc. Profiles store accumulative knowledge of users, interactive systems, actions, etc. In some embodiments, profile handler 210 collects such knowledge via manual input from users or by observing user activity on a user device. In some embodiments, profile handler 210 mines various data sources (e.g., personal files, transactions, public information) to build these profiles. Additionally, profile handler 210 may continuously or periodically update profiles, e.g., based on new information learned from each communication session between user device 110 and interactive system 120 of FIG. 1. In some embodiments, profile handler 210 (or system profile manager 320, described in connection to FIG. 3) may learn from other users interacting with a particular interactive system 120 of FIG. 1. For example, as described herein, where other users have interacted with a particular interactive system 120, information learned from the interaction may be used to construct a system profile.

Context handler 220 is configured to manage context information of communication sessions, e.g., between user device 110 and interactive system 120 of FIG. 1. By way of example, when there is a call between user device 110 and interactive system 120, context handler 220 may gather context information related to the parties involved in the call, the phone numbers of the call, the purpose of the call, history of similar calls, the calendar information of the user, the ongoing activities on user device 110, the schedule of related parties (e.g., teammates/coworkers), similar calls to other users from the caller, the outcome of those similar calls, etc. In some embodiments, such a context information gathering process started before the call. As an example, to initiate a call on behalf of the user, context handler 220 may gather context information of the call well before dialing the number.

Further, context handler 220 may develop new intelligence based on the basic context information. By way of example, a user may have separate contacts, calendar, tasks, etc., for work purpose and personal purpose. Based on the information of the caller, context handler 220 may deduce whether the call is for work or personal matters, and accordingly gather more relevant context information, e.g., from pertinent contacts, calendar, etc. As a result, context handler 220 may develop more pertinent context information for each communication session.

Communication handler 230 is the master of various communication protocols, and manages communication channels. First, communication handler 230 determines the form of communication, whether it is text, voice, video, tactile, sensory, etc. Then, communication handler 230 determines the protocol to handle the communication. For instance, a voice call may be handled in a public switched telephone network (PSTN) or a voice over Internet protocol (VoIP) network with different protocols. Further, communication handler 230 uses speech recognition and speech generation technologies to process the content of the call. In some embodiments, communication handler 230 can simulate the voice of the user based on voice samples of the user, e.g., collected in a voice training session with the user. In some embodiments, communication handler 230 may further route a communication session from one user device to another. As an example, in response to a user command, communication handler 230 may redirect the ongoing voice call from the user's mobile phone to the speaker phone in the conference room.

In various embodiments, communication handler 230 will navigate at least two interactive states in the interactive system, e.g., based on the context information of the call or a navigational guide in the system profile of the interactive system. An interactive state may include one level of the hierarchical navigational menu of the interactive system. For example, the main menu of an IVR system may be one interactive state while the submenu after the main menu may be another interactive state. Communication handler 230 can navigate multiple interactive states of the interactive system until reaching a live person. When the interactive system is an IVR system, communication handler 230 may further generate voice to navigate the IVR system.

In some embodiments, communication handler 230 may initiate a call to an IVR system, e.g., based on the context information associated with a communication event. As an example, the communication event is a calendar event for the user to pay a bill. The context information may include the contact information for the billing company and information of a user's credit card. To verify whether there is sufficient available credit to pay the bill, personal assistant 200 may direct communication handler 230 to call the IVR system of the credit card company to retrieve the credit limit and/or the available credit of the credit card.

Action handler 240 includes numerous application programing interfaces (APIs) and protocols to execute different actions. As an example, action handler 240 may use the API to Microsoft Office® to schedule a Skype® meeting for the user following a call. As another example, action handler 240 may use the hypertext transfer protocol (HTTP) to schedule an online appointment with a doctor's office via the doctor's website. Similarly, action handler 240 may use other APIs or protocols to execute other actions, such as to set an alarm, to open a file, to send a file, to send a message, to reply to an email, to post an update on a social network, etc.

In some embodiments, action handler 240 performs a task for the user in response to a signal from the interactive system. For example, the signal is a voice prompt from an IVR system, which prompts the caller to dial another phone number. In this case, action handler 240 may dial the new number for the user. In some embodiments, action handler 240 performs a task for the user in response to a signal from the user profile. For example, the signal may be an existing appointment at the same time when the user is trying to schedule an appointment. In this case, the action is to remind the user of the existing appointment, and automatically reschedule the existing appointment to resolve the scheduling conflict. In some embodiments, action handler 240 performs an action for the user in response to a signal from the communication session. For example, the signal may be the confirmation of an appointment at a specific time indicated from the communication session. In this case, the action may be to note the user's calendar for the newly confirmed appointment.

In one embodiment, personal assistant 200 is enabled to communicate with a shipping company regarding a package. The user intends to schedule a pickup for the package from the user's home. During the communication session, the IVR system of the shipping company may send a signal to personal assistant 200, e.g., prompting personal assistant 200 to input the address of the user's home and the desired date and time for the pickup. In this case, action handler 240 may check the user's home and the user's calendar based on the user profile of the user, and send the address and appropriate date and time to the IVR in response to such prompt. In various embodiments, action handler 240 may also perform a task for the user in response to one or more signals from the user profile of the user, the system profile of an interactive system, the communication channel, the context information, etc.

Many of the system components described herein are functional entities that may be implemented as discrete or distributed components or in conjunction with other components, and in any suitable combination and location. Further, various functions described herein as being performed by one or more system components may be carried out by hardware, firmware, and/or software. For instance, some functions related to profile handler 210, context handler 220, communication handler 230, and action handler 240 may be carried out by a processor executing instructions stored in memory.

In various embodiments, the functions performed by the system components of personal assistant 200 (or user agent 112 in FIG. 1) are associated with one or more IPA applications, services, or routines. In particular, such applications, services, or routines may operate on one or more user devices (such as user device 110 in FIG. 1), servers (such as business server 130 in FIG. 1), may be distributed across one or more user devices and servers, or be implemented in the cloud.

Referring now to FIG. 3, a block diagram is provided showing an exemplary computing device or application suitable for implementing one or more aspects of the present disclosure. The exemplary computing device or application is designated generally as profile handler 300, which may be embodied as profile handler 210 in FIG. 2. Profile handler 300 includes system components of user profile manager 310, system profile manager 320, and action profile manager 330, communicatively coupled to each other. In various embodiments, profile handler 300 may be implemented as one or more computing devices, applications, or services that enable assisted-communication for an IPA, such as personal assistant 200.

User profile manager 310 manages user profiles. A user may directly input his or her personal information and preferences to user profile manager 310. For instance, a form or a questionnaire may be developed for such intake purposes. More often, user profile manager 310 may monitor activities of a user and analyze such activity data to automatically update the user profile for the user. As an example, user profile manager 310 can build the user profile based on the prior communication between the user and the interactive system. For instance, if the user always uses email to communicate with a service provider, then the preferred communication form may be set as email in the user profile for this particular service provider. As another example, user profile manager 310 may find that the majority of personal calls of the user were made during the lunch hour in the past week. Accordingly, user profile manager 310 may automatically update the lunch hour as the preferred time to make personal calls for this user.

Further, user profile manager 310 may use statistical or generalized information from a collection of user profiles to update the user profile for a specific user. As an example, user profile manager 310 may find a significant portion of users in a geographical region (e.g., New York City) with a particular profession (e.g., attorneys) like to buy coffee on their way to work. Accordingly, user profile manager 310 may recommend setting up a reminder for coffee for a newly created user profile if the location and profession match with the statistical or generalized information.

System profile manager 320 manages system profiles for interactive systems. Similar to the process for managing user profiles, a user may directly input system information of an interactive system to system profile manager 320. System profile manager 320 may also automatically build and update the system profile for an interactive system, e.g., based on public information of the interactive system. As an example, system profile manager 320 may locate the contact information for the interactive system from the website associated with the interactive system or even an online directory of businesses. Alternatively, or in addition, businesses or companies may publish system profiles for their interactive communication systems or IVR (or make available information that may be used to generate a system profile for their system.)

System profile manager 320 may also automatically build and update the system profile for an interactive system based on prior communications with the interactive system, e.g., from a primary user or other users' experiences with the interactive system. Thus system profile manager 320 (or profile handler 300) may learn from other users interacting with a particular interactive system (e.g., interactive system 120 of FIG. 1). For example, where other users have interacted with a particular interactive system, information learned from the interaction may be used to construct a system profile. By way of example, in one embodiment, system profile manager 320 may track the interactions between another user and the same interactive system. Based on the interactive history of the interactive system with one or more users, system profile manager 320 may develop a navigational map (e.g., including the options menu) of the interactive system. For instance, the menu of a customer service IVR system for a business may be learned after analyzing multiple communication sessions with different menu selections from different users. The navigational map of the interactive system may assist personal assistant 132 or personal assistant 200 to determine the capability of the IVR system and choose an appropriate navigational pathway in the IVR system based on the user's goal.

In some embodiments, system profiles may be made available in an online clearing house (not shown) or cloud-based storage, or may be accessed directly from computing resources associated with the company or business. For example, in some embodiments, system profiles of various interactive systems may be made available to profile handler 300 (or personal assistant 200 of FIG. 2, or personal assistant 132 of FIG. 1). The various system profiles may cover interactive systems or IVRs for many companies or businesses, such as particular phone companies, cable companies, or utilities (e.g., electric, water, gas), or other businesses, companies, or organizations using interactive communications systems or IVRs. In this way, profile handler 300 may utilize system profiles of respective interactive systems where user interaction has not previously occurred.

Action profile manager 330 manages action profiles. In one embodiment, the action profile is a template to execute an action. Scheduling a meeting, as an example, may require a workflow template. For instance, the first step is to identify attendees, location, time, duration, etc., of the meeting. The second step is to determine the meeting agenda. The third step is to send out the meeting invitation. The fourth step is to confirm the meeting or reschedule the meeting based on the response from invitees. As such, action profile manager 330 may build different profiles for different actions. Before, during, or after a communication session, action profile manager 330 may invoke appropriate action profiles to assist personal assistant 132 or personal assistant 200 to perform an action (e.g., schedule a meeting, receive a call, make a call).

In some embodiments, action profile manager 330 may build an action profile for an action based on the user profile of the user as well as another user profile of another user. As an example, the user developed a heart condition marked by paroxysms of chest pain, and requests personal assistant 132 to schedule a doctor's appointment for the chest pain. Based on the context information gathered around chest pain, personal assistant 132 determines that the user may possess a cardiovascular symptom and a cardiologist is preferred to exam the user in this case. However, there is no preferred cardiologist on the user profile of the user. Therefore, action profile manager 330 needs to dynamically build an action profile for this user to see a cardiologist. In this case, action profile manager 330 may research user profiles of other users with a similar background, such as in the same age group, the same sex, the same zip code for home, etc. In this way, action profile manager 330 may select a cardiologist with a great reputation who is also used by other similarly situated users to complete the action profile of seeing a cardiologist.

In various embodiments, markup languages may be developed to enable machine processing of these profiles, such as user profiles, system profiles, or action profiles. Further, these markup languages may facilitate personal assistant 132 or personal assistant 200 to make semantic analysis or logical deduction based on these profiles.

Additionally, in various embodiments, the functions performed by the blocks or "components" of FIGS. 1, 2, and 3, including subcomponents, may be associated with one or more IPA applications, services, or routines. In particular, such applications, services, or routines may operate on one or more user devices (such as a user device 110 in FIG. 1), servers (such as business server 130 in FIG. 1), may be distributed across one or more user devices and servers, or be implemented in the cloud. These components including subcomponents, may be distributed across a network, including one or more servers and user devices. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the embodiments of the invention described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in personal assistant 200, it is contemplated that in some embodiments functionality of these components can be shared or distributed across other components.

Figure 4:
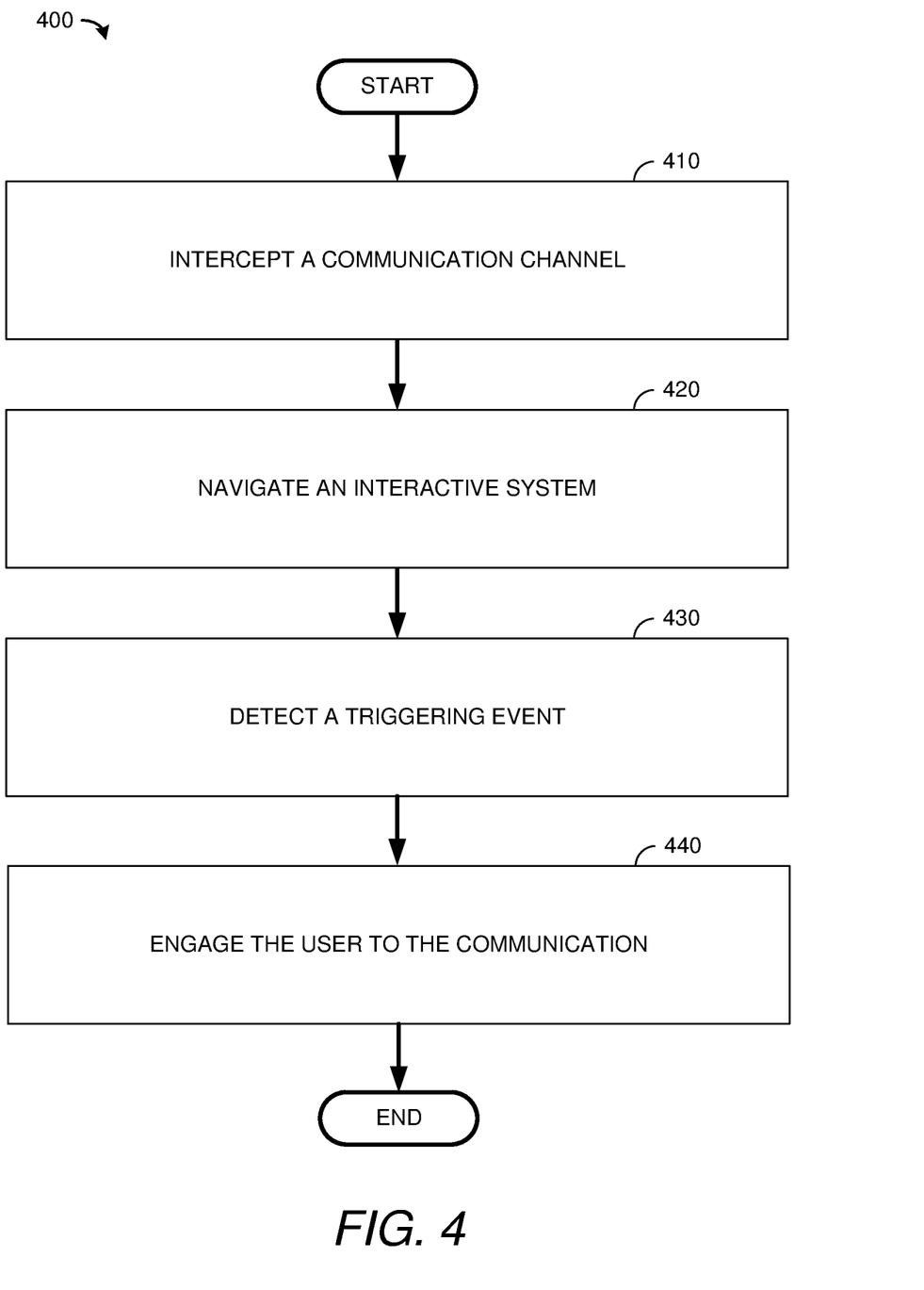
FIG. 4 is a flow diagram showing an exemplary process of assisted-communication, in accordance with aspects of the technology described herein.

Turning now to FIG. 4, a flow diagram is illustrated showing an exemplary process of assisted-communication, in accordance with an aspect of the technology described herein. Process 400 may be performed by one or more computing devices, such as computing device 700 of FIG. 7. In some embodiments, process 400 may be operated in a computing environment, such as operating environment 100 of FIG. 1, and may be carried out by or implemented using a personal assistant 132 or a user agent 112.

At block 410, process 400 intercepts a communication channel. In some embodiments, the communication channel is a messaging system, e.g., an instant messaging system. In various embodiments, the communication channel is a voice call through a user device, e.g., a cellular phone. Personal assistant 132 in connection with user agent 112 may identify the present status of the user. If the user is unavailable to answer an incoming call or message, personal assistant 132 may intercept the call or the messaging session.

In some embodiments, the availability or unavailability of the user may be specified by the user, e.g., manually defined (e.g., by the user) in the user profile of the user. For instance, the user may define certain blocks of time during the night as designated time for rest, and therefore will not answer any calls during this time. In some embodiments, personal assistant 132 may infer the availability or unavailability of the user based on various signals, e.g., calendar information, location information, signal strength of the user device, etc. For instance, during certain important meetings, as shown in the user's calendar, it may be inferred that the user prefer not to answer calls. When the user is unavailable, personal assistant 132 may act as a listener for incoming calls to the user so that personal assistant 132 may intercept those calls. In some embodiments, personal assistant 132 will send a message (e.g., with the caller information) to the user device to remind the user that an incoming call has been intercepted. In this case, the user may overwrite the interception and answer the call if necessary.

At block 420, the process is to navigate an interactive system. In some embodiments, the call is from an IVR system. Here, personal assistant 132 may navigate the IVR system, e.g., based on the system profile of the IVR system. In various embodiments, personal assistant 132 may utilize the navigational guide in the system profile and information in the user profile of the user to interact with the IVR system.

At block 430, the process is to detect a triggering event. The triggering event will cause personal assistant 132 to change the interaction form. The triggering event may be a communication issue, such as being blocked in the IVR system, being unable to proceed with the IVR menu, receiving repeated prompts, facing speech recognition issues, etc. The triggering event could also be the voice of a live representative in the IVR system, which suggests that the user needs to be engaged for the person-to-person discussion. Personal assistant 132 may detect the voice of a live person based on the characteristics of the voice, such as the frequency, the pace, etc. of the voice.

At block 440, the process is to engage the user to the communication. Once a live person is detected, personal assistant 132 may prompt the user to answer the call or start to chat in the messaging system.

Figure 5:
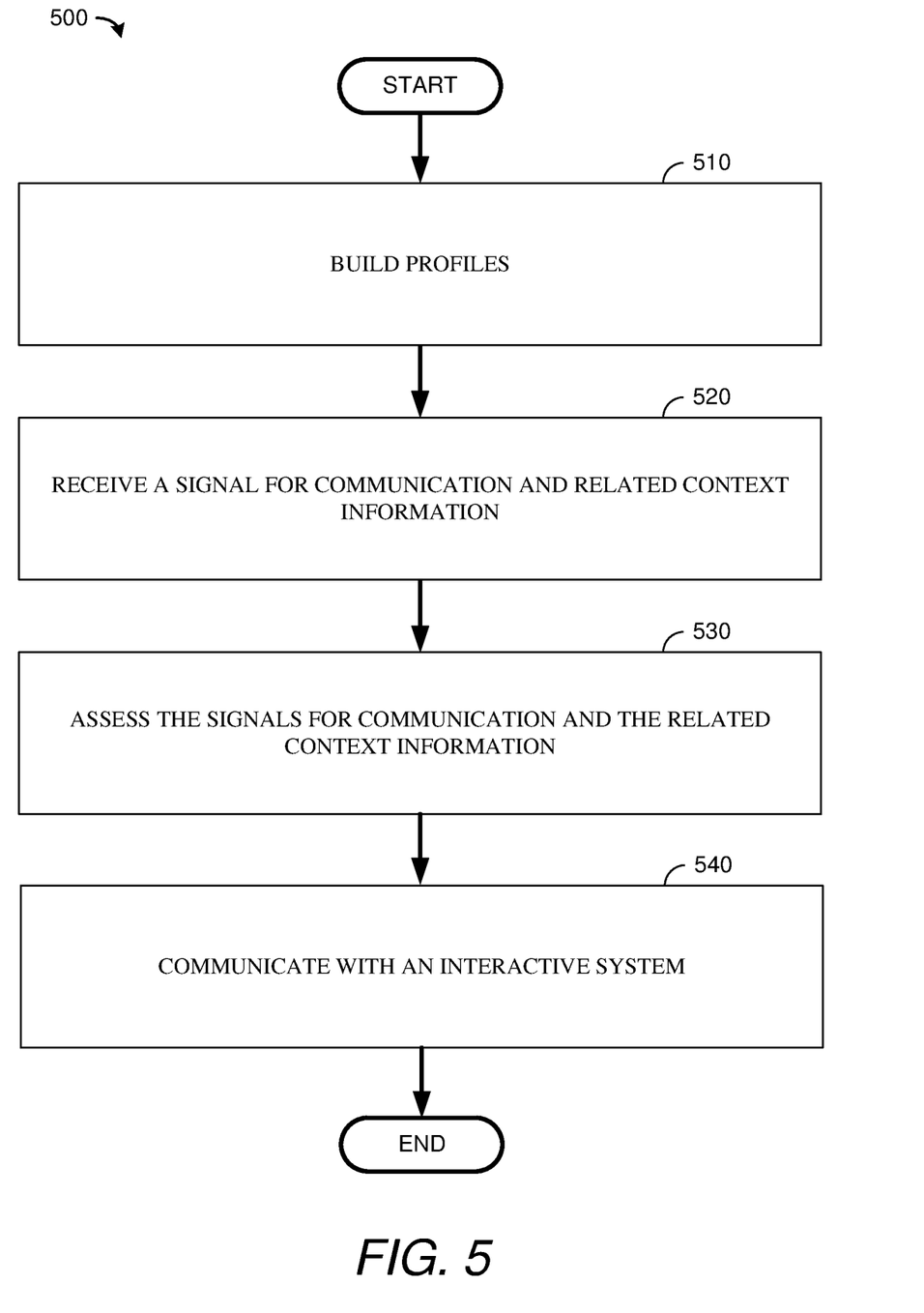
FIG. 5 is a flow diagram showing another exemplary process of assisted-communication, in accordance with aspects of the technology described herein.

Turning now to FIG. 5, a flow diagram is illustrated showing an exemplary process of assisted-communication, in accordance with an aspect of the technology described herein. Process 500 may be performed on one or more computing devices, such as computing device 700 of FIG. 7. In various embodiments, process 400 may operate in a computing environment, such as operating environment 100 of FIG. 1, and may be carried out by or implemented using a personal assistant 132 or a user agent 112.

At block 510, process 500 builds profiles, including user profiles for users, system profiles for interactive systems, action profiles for actions, etc. In various embodiments, profile handler 210 or profile handler 300 may be used to build profiles. Profile handler 300 may build a user profile for a user based on prior communications between the user and an interactive system. For instance, the user may provide personal information to the interactive system during the communication. Accordingly, such personal information may be used to populate the user profile for the user.

Profile handler 300 may build a system profile for an interactive system with a navigational guide. In some embodiments, this navigational guide may be built based on prior communication between one or more users and the interactive system. The navigational guide may reproduce the complete menu of the interactive system. In this way, the intelligent personal assistant may navigate the interactive system based on the navigational guide. Further, with the navigational guide, the intelligent personal assistant may expedite the interaction process, such as jumping directly to the appropriate menu selection and skipping unrelated menu options.

At block 520, the process is to receive a signal for communication and related context information. For example, the intelligent personal assistant may access a user's calendar. The signal for communication may be a calendar event for making a doctor's appointment. Further, the intelligent personal assistant may receive context information related to the calendar event, which may include the doctor's contact information, the office hours of the doctor, the location of the doctor's office, the doctor's specialty, the user's prior visiting history, the urgency of the user's health condition, the user's present status, etc.

At block 530, the process is to assess the signals for communication and the related context information. For example, the intelligent personal assistant may evaluate the calendar event and determine an appropriate time to call the doctor's office to schedule the appointment, e.g., when the doctor's office is open and the user is available to discuss this appointment. Further, the intelligent personal assistant may assess the context information to find a suitable time for the appointment, e.g., when the doctor is working and the user can take a personal leave to visit the doctor.

At block 540, the process is to communicate with an interactive system. Here, the intelligent personal assistant may call the doctor's office and reach an IVR system for automated appointment scheduling. For instance, the first interactive state of the IVR system is to select a department in a hospital; the second interactive state of the IVR system is to select a specialty in that department; the third interactive state of the IVR system is to select a doctor with that specialty; the fourth interactive state of the IVR system is to select a date and time for the appointment; and so forth. In this case, the intelligent personal assistant may navigate multiple interactive states in the IVR system, e.g., based on the context information, such as the specialty of the doctor, the name of the doctor, the preferred location for the visit, the information in the user's calendar, etc.

Figure 6:
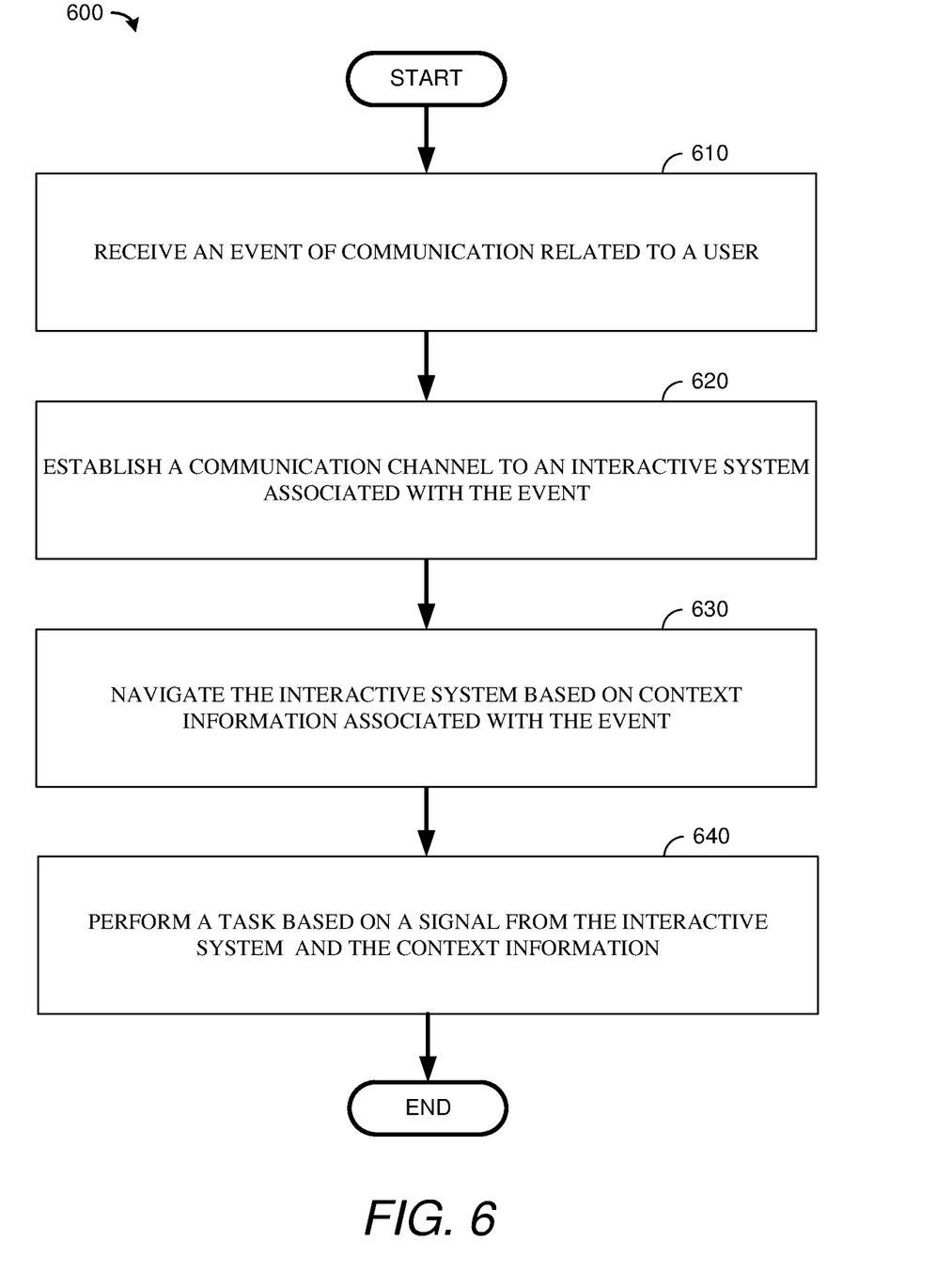
FIG. 6 is a flow diagram showing yet another exemplary process of assisted-communication, in accordance with aspects of the technology described herein.

Turning now to FIG. 6, a flow diagram is illustrated showing an exemplary process of assisted-communication, in accordance with an aspect of the technology described herein. Process 600 may be performed on one or more computing devices, such as computing device 700 of FIG. 7. In some embodiments, process 400 may operate in a computing environment, such as operating environment 100 of FIG. 1, and may be carried out by or implemented using a personal assistant 132 or a user agent 112.

At block 610, process 600 receives an event of communication related to a user. As an example, the user specifies to the IPA the business that the user is trying to reach (e.g., an insurance company), the reason to contact the business (e.g., provide supplemental information for an existing claim), and the times when the user is available (e.g., between 8 p.m. to 10 p.m.). Subsequently, the IPA will retrieve relevant context information for this event of communication, e.g., when the business is open and the previous communication between the user and the business. Further, the IPA will retrieve the user profile of the user and the system profile of the interactive system associated with the business.

At block 620, the process is to establish a communication channel to an interactive system associated with the event. Continuing with the previous example, the IPA may call the phone number or use a similar contact address of the interactive system. The phone number or contact address may be found from the system profile of the interactive system.

At block 630, the process is to navigate the interactive system based on context information associated with the event. Continuing with the previous example, if the line is busy or no one picks up, the IPA will retry or wait on the line until the call gets through. If the IPA reaches an IVR system, the IPA will navigate the system and wait on the line until the call gets through to a live representative. At this point, the IPA will connect the user to the call so that the user may resolve the remaining issues in this claim with the representative.

In various embodiments, the IPA will navigate the interactive system, e.g., based on the context information of this call. For instance, the context information may include a claim number of the car accident that the user intended to discuss with the insurance company. In this case, the IPA may navigate the interactive system using the claim number, so that the IPA may correctly reach the claims department of the insurance company.

At block 640, the process is to perform a task based on a signal from the interactive system and the context information. Continuing with the previous example, the IPA may successfully complete the claim submission process and receive a recommendation from the interactive system to repair the damaged car in an approved body shop. The recommendation is the signal to prompt the IPA to perform other tasks, such as to schedule an appointment with the body shop and further note the appointment to the calendar of the user. The context information may include a list of approved body shops and the location of the damaged car. In this case, the IPA may select a body shop closer to the location of the damaged car to schedule this appointment.

Accordingly, we have described various aspects of technologies directed to assisted-communication with an intelligent personal assistant. It is understood that various features, sub-combinations, and modifications of the embodiments described herein are of utility and may be employed in other embodiments without reference to other features or sub-combinations. Moreover, the order and sequences of steps shown in the example processes 400, 500, and 600 are not meant to limit the scope of the present disclosure in any way, and in fact, the steps may occur in a variety of different sequences within embodiments hereof. Such variations and combinations thereof are also contemplated to be within the scope of embodiments of this disclosure.

Figure 7:
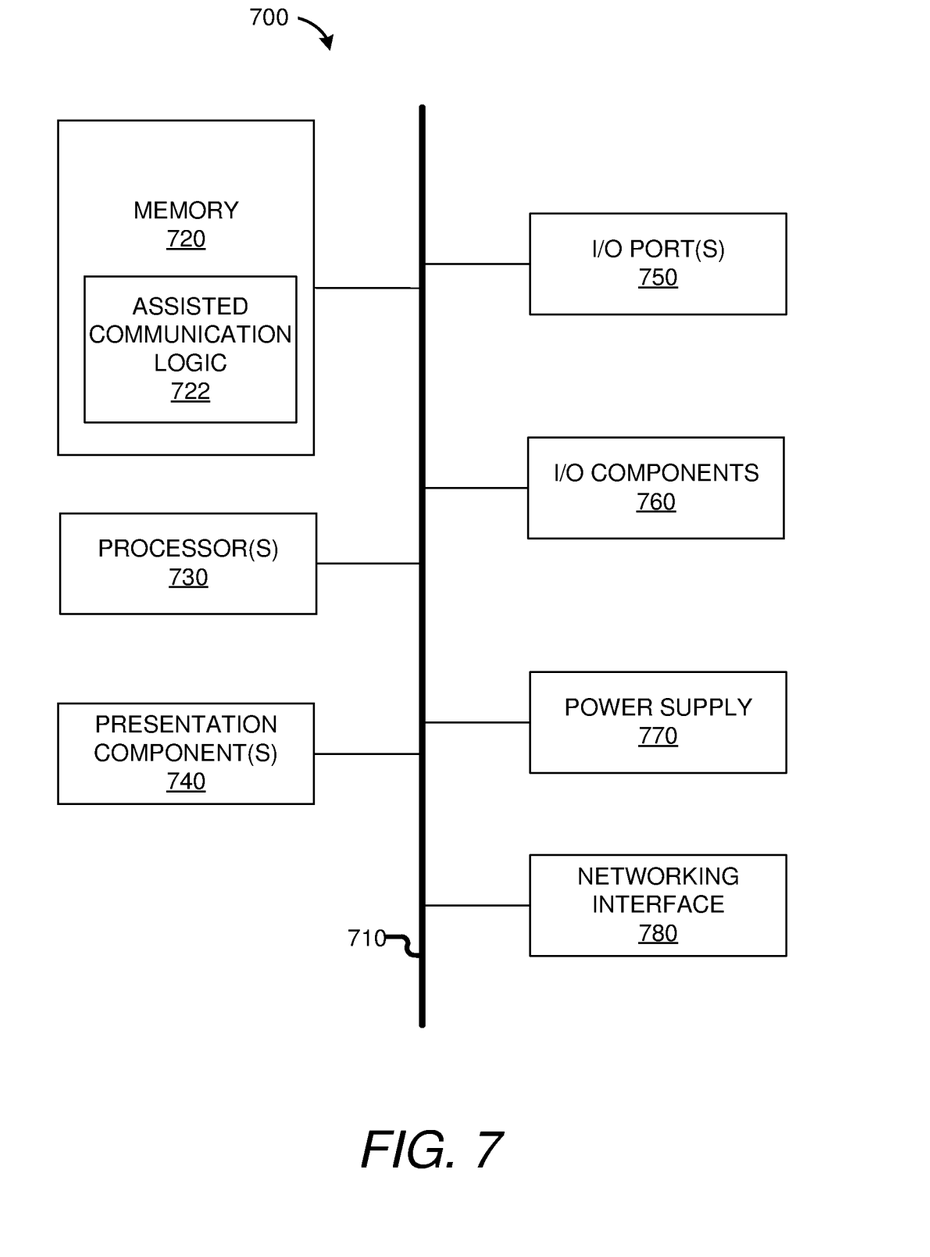
FIG. 7 is a block diagram of an exemplary computing environment suitable for use in implementing aspects of the technology described herein.

Having described various implementations, an exemplary computing environment suitable for implementing embodiments of the disclosure is now described. With reference to FIG. 7, an exemplary computing device is provided and referred to generally as computing device 700. The computing device 700 is but one example of a suitable computing environment and is not intended to suggest any limitation as to the scope of use or functionality of embodiments of the disclosure. Neither should the computing device 800 be interpreted as having any dependency or requirement relating to any one or combination of components illustrated.

The technology described herein may be described in the general context of computer code or machine-useable instructions, including computer-executable instructions such as program components, being executed by a computer or other machine. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are connected through a communications network.

With continued reference to FIG. 7, computing device 700 includes a bus 710 that directly or indirectly couples the following devices: memory 720, one or more processors 730, one or more presentation components 740, input/output (I/O) ports 750, I/O components 760, and an illustrative power supply 770. Bus 710 represents what may be one or more busses (such as an address bus, data bus, or a combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 7 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 7 and refer to "computer" or "computing device."

Computing device 700 typically includes a variety of computer-readable media. Computer-readable media can be any available media that can be accessed by computing device 700 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 720 includes computer storage media in the form of volatile and/or nonvolatile memory. The memory 720 may be removable, non-removable, or a combination thereof. Exemplary memory includes solid-state memory, hard drives, optical-disc drives, etc. Computing device 700 includes one or more processors 730 that read data from various entities such as bus 710, memory 720, or I/O components 760. Presentation component(s) 740 present data indications to a user or other device. Exemplary presentation components 740 include a display device, speaker, printing component, vibrating component, etc. I/O ports 750 allow computing device 700 to be logically coupled to other devices, including I/O components 760, some of which may be built in.

In various embodiments, memory 720 includes, in particular, temporal and persistent copies of assisted-communication logic 722. Assisted-communication logic 722 includes instructions that, when executed by one or more processors 730, result in computing device 700 performing various functions, such as, but not limited to, processes 400, 500, or 600. In various embodiments, assisted-communication logic 722 includes instructions that, when executed by processor(s) 730, result in computing device 700 performing various functions associated with, but not limited to, profile handler 210, context handler 220, communication handler 230, and action handler 240 in connection with FIG. 2; and user profile manager 310, system profile manager 320, or action profile manager 340 in connection with FIG. 3.

In some embodiments, one or more processors 730 may be packaged together with assisted-communication logic 722. In some embodiments, one or more processors 730 may be packaged together with assisted-communication logic 722 to form a System in Package (SiP). In some embodiments, one or more processors 730 can be integrated on the same die with assisted-communication logic 722. In some embodiments, processors 730 can be integrated on the same die with assisted-communication logic 722 to form a System on Chip (SoC).

Illustrative I/O components include a microphone, joystick, gamepad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 730 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

Computing device 700 may include networking interface 780. The networking interface 780 includes a network interface controller (NIC) that transmits and receives data. The networking interface 780 may use wired technologies (e.g., coaxial cable, twisted pair, optical fiber, etc.) or wireless technologies (e.g., terrestrial microwave, communications satellites, cellular, radio and spread spectrum technologies, etc.). Particularly, the networking interface 780 may include a wireless terminal adapted to receive communications and media over various wireless networks. Computing device 700 may communicate via wireless protocols, such as Code Division Multiple Access (CDMA), Global System for Mobiles (GSM), or Time Division Multiple Access (TDMA), as well as others, to communicate with other devices via the networking interface 780. The radio communications may be a short-range connection, a long-range connection, or a combination of both a short-range and a long-range wireless telecommunications connection. A short-range connection may include a Wi-Fi® connection to a device (e.g., mobile hotspot) that provides access to a wireless communications network, such as a wireless local area network (WLAN) connection using the 802.11 protocol. A Bluetooth connection to another computing device is a second example of a short-range connection. A long-range connection may include a connection using one or more of CDMA, GPRS, GSM, TDMA, and 802.16 protocols.

The technology described herein has been described in relation to particular aspects, which are intended in all respects to be illustrative rather than restrictive. While the technology described herein is susceptible to various modifications and alternative constructions, certain illustrated aspects thereof are shown in the drawings and have been described above in detail. It should be understood, however, that there is no intention to limit the technology described herein to the specific forms disclosed, but on the contrary, the intention is to cover all modifications, alternative constructions, and equivalents falling within the spirit and scope of the technology described herein.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention.

What is claimed is:

1. A computing system, comprising:
a profile handler to receive a user profile of a user and a system profile of an interactive system;
a context handler, communicatively coupled to the profile handler, to receive an event of communication related to the user and context information associated with the event; and
a communication handler, communicatively coupled to the profile handler and the context handler, to dynamically generate speech via speech generation, and to navigate at least two interactive states in the interactive system based on the dynamically generated speech and the context information associated with the event without a direct engagement of the user.

2. The computing system of claim 1, further comprising:
an action handler, coupled to the communication handler, to perform a task for the user based on a signal from the interactive system and the user profile.

3. The computing system of claim 2, wherein the profile handler comprises an action profile manager to build an action profile for the task based on the user profile and another user profile of another user.

4. The computing system of claim 1, wherein the profile handler comprises a user profile manager to build the user profile based on a prior communication between the user and the interactive system.

5. The computing system of claim 1, wherein the profile handler comprises an interactive system profile manager to build the system profile with a navigational guide based on a prior communication between another user and the interactive system.

6. The computing system of claim 5, wherein the communication handler is to navigate the at least two interactive states in the interactive system further based on the navigational guide.

7. The computing system of claim 1, wherein the communication handler is to generate the speech based on a simulated voice of the user that is based on a plurality of samples of the user's voice during a voice training session.

8. The computing system of claim 7, wherein the communication handler is to intercept a call from the interactive voice response system and to identify a voice of a live person associated with the interactive voice response system before the user engages the call.

9. The computing system of claim 8, wherein the communication handler is to engage the user to the call based on the voice of the live person.

10. The computing system of claim 7, wherein the communication handler is to initiate a call to the interactive voice response system based on the context information associated with the event.

11. A computer-implemented method, comprising:
receiving, by a processor, an event of communication related to a user;
establishing, by the processor, without a direct engagement of the user, a communication channel to an interactive system associated with the event based on a preference of the user to communicate with the interactive system; and
navigating, by the processor, at least two interactive states in the interactive system based on context information associated with the event, wherein the navigating the at least two interactive states in the interactive system is performed by a voice generated via speech generation.

12. The method of claim 11, further comprising:
performing a task for the user based on a signal from the interactive system and context information associated with the event.

13. The method of claim 11, further comprising:
detecting a signal indicative of a live person from the interactive system; and
engaging the user to the communication channel based on the signal.

14. The method of claim 11, further comprising:
building a system profile for the interactive system with a navigational guide; and
wherein the navigating the interactive system is further based on the navigational guide.

15. The method of claim 11, further comprising:
gathering the context information associated with the event from a calendar of the user and a status of a mobile device of the user.

16. The method of claim 11, wherein the interactive system is an interactive voice response system, the method further comprising:
intercepting a call from the interactive voice response system to the user or initiating a call to the interactive voice response system for the user.

17. A computer-readable hardware device having computer-executable instructions embodied thereon that, when executed by a computing system having a processor and memory, cause the computing system to:
intercept a communication channel between an interactive system and a user before a direct engagement of the user with the communication channel;
navigate at least two interactive states in the interactive system based on a user profile of the user and a system profile of the interactive system, wherein the navigate the at least two interactive states in the interactive system is performed by a voice generated via speech generation;
detect a signal indicative of a live person associated with the interactive system from one of the at least two interactive states; and
engage the user to the communication channel based on the signal.

18. The computer-readable hardware device of claim 17, wherein the instructions further cause the one or more computing devices to:
build the user profile based on a prior communication between the user and the interactive system; and
build the system profile with a navigational guide based on a prior communication between another user and the interactive system.

19. The computer-readable hardware device of claim 17, wherein the instructions further cause the one or more computing devices to:
gather context information associated with the communication channel; and
navigate the at least two interactive states in the interactive system further based on the context information.

20. The computer-readable hardware device of claim 17, wherein the interactive system is an interactive voice response system, and the communication channel is a voice call, wherein the instructions further cause the one or more computing devices to:

identify a present status of the user to be unavailable to take the voice call; and intercept the voice call based on the present status of the user.

* * * * *